United States Patent
Hosomi

(10) Patent No.: US 9,025,890 B2
(45) Date of Patent: May 5, 2015

(54) INFORMATION CLASSIFICATION DEVICE, INFORMATION CLASSIFICATION METHOD, AND INFORMATION CLASSIFICATION PROGRAM

(75) Inventor: Itaru Hosomi, Minato-ku (JP)

(73) Assignee: NEC Corporation, Tokyo (JP)

( * ) Notice: Subject to any disclaimer, the term of this patent is extended or adjusted under 35 U.S.C. 154(b) by 1191 days.

(21) Appl. No.: 12/302,483

(22) PCT Filed: May 21, 2007

(86) PCT No.: PCT/JP2007/060741
§ 371 (c)(1),
(2), (4) Date: Nov. 25, 2008

(87) PCT Pub. No.: WO2007/139039
PCT Pub. Date: Dec. 6, 2007

(65) Prior Publication Data
US 2009/0148048 A1    Jun. 11, 2009

(30) Foreign Application Priority Data

May 26, 2006    (JP) ................................. 2006-146148
May 10, 2007    (JP) ................................. 2007-125612

(51) Int. Cl.
    *G06K 9/62*           (2006.01)
    *G06K 9/72*           (2006.01)
    *G06F 17/30*          (2006.01)

(52) U.S. Cl.
    CPC ................................ *G06F 17/30705* (2013.01)

(58) Field of Classification Search
CPC .......... G06F 17/3061; G06F 17/30705; G06F 17/2276; G06F 17/2818; G06F 17/30256; G06K 9/0014; G06K 9/6282; G06K 9/6292; G06K 9/00; G06K 9/00422; G06K 9/00456; G06K 9/00463; G06K 9/6219; G06T 2207/30176; G10L 13/08; G10L 15/08; G10L 15/197
USPC ....................................................... 382/229
See application file for complete search history.

(56) References Cited

U.S. PATENT DOCUMENTS

| 6,052,693 | A | 4/2000 | Smith et al. |
| 6,178,396 | B1 * | 1/2001 | Ushioda ............................ 704/1 |
| 6,535,619 | B1 * | 3/2003 | Suwa et al. .................... 382/101 |
| 7,072,880 | B2 * | 7/2006 | Beesley ................................ 1/1 |
| 7,167,823 | B2 * | 1/2007 | Endo et al. ........................ 704/7 |

(Continued)

FOREIGN PATENT DOCUMENTS

| JP | 09-282208 A | 10/1997 |
| JP | 2000-268033 A | 9/2000 |

(Continued)

OTHER PUBLICATIONS

Akiko Aizawa, et al., "Techniques and Research Trends in Record Linkages Studies ", The Institute of Electronics, Information and Communication Engineers, Mar. 2005, pp. 576-589, vol. J88-D-I, No. 3.

(Continued)

*Primary Examiner* — Amir Alavi
*Assistant Examiner* — Kenny Cese
(74) *Attorney, Agent, or Firm* — Sughrue Mion, PLLC

(57) ABSTRACT

A table record estimation device includes: a table element string extraction unit having a function of extracting text data from input data and acquiring a series of keywords as an element of a table (table data) from the extracted text data; a table element labeling unit having a function of labeling the individual keywords acquired by the table element string extraction unit for each type based on correspondence information stored in a classification rule storage unit; and a label appearance pattern estimation unit having a function of estimating a label permutation constituting one-unit record from a label string attached for the each type by the table element labeling unit and outputting the label permutation as a record estimation result.

18 Claims, 10 Drawing Sheets

(56) References Cited

U.S. PATENT DOCUMENTS

| | | | |
|---|---|---|---|
| 2001/0028742 A1* | 10/2001 | Gunji et al. | 382/229 |
| 2003/0046078 A1 | 3/2003 | Abrego et al. | |
| 2003/0233225 A1* | 12/2003 | Bond et al. | 704/4 |
| 2004/0123233 A1 | 6/2004 | Cleary et al. | |
| 2005/0022115 A1 | 1/2005 | Baumgartner et al. | |
| 2005/0256715 A1* | 11/2005 | Okimoto et al. | 704/257 |
| 2006/0080299 A1* | 4/2006 | Shimogori et al. | 707/3 |

FOREIGN PATENT DOCUMENTS

| | | | |
|---|---|---|---|
| JP | 2003-150624 A | 5/2003 | |
| JP | 2004-240517 A | 8/2004 | |
| JP | 3705439 B1 | 10/2005 | |

OTHER PUBLICATIONS

Miwako Doi, et al., "Development of Document Architecture Extraction", The Institute of Electronics and Communication Engineers, Sep. 1993, pp. 2042-2052, vol. J76-D-II, No. 9.

Itaru Hosomi, et al., "Bunsho Naiyo Kaiseki to Settei Kensho ni Motozuku Joho Roei Kyoi Bunseki Hoshiki (2) Bunsho Naiyo to Kozo Kaiseki o Mochiita Kimitsu Joho Bunrui", Information Processing Society of Japan, Mar. 2005, pp. 35-36.

Itaru Hosomi, "Methods of Sensitive Document Detection for Information Asset Management and Personal Information Protection", Information Processing Society of Japan, Sep. 2006, pp. 53-60, vol. 2006, No. 104.

Japanese Office Action dated Jul. 11, 2012 issued in counterpart Japanese Patent Application No. 2008517918.

Office Action issued Sep. 16, 2013, by the European Patent Office in corresponding application No. 07744175.6.

Laali Elkhalifa et al., "InfoFilter", Proceedings of the 2005 ACM symposium on Applied computing, SAC '05, Jan. 1, 2005, pp. 1084-1088.

\* cited by examiner

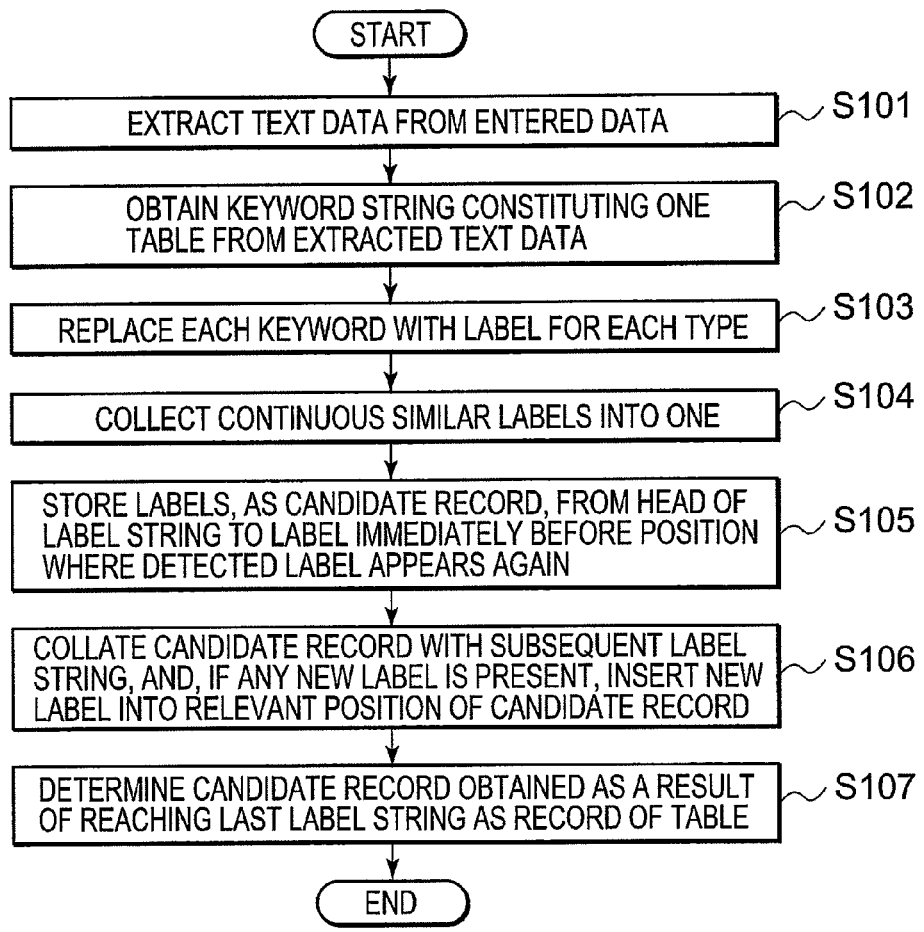

701 (OUTPUT RESULT)

| LABEL | A | B | D | C |
|---|---|---|---|---|
| TYPE | NAME | GEOGRAPHIC NAME | TELEPHONE NUMBER | E-MAIL ADDRESS |

| NAME | JOINT NAME | ADDRESS | | CONTACT ADDRESS | |
| --- | --- | --- | --- | --- | --- |
| | | PREFECTURE | CITY, WARD, TOWN, VILLAGE | TELEPHONE NUMBER | E-MAIL ADDRESS |
| TARO YAMADA | HANAKO YAMADA | TOKYO | MINATO-KU | | taro@sample.com |
| JIRO TANAKA | | OSAKA | KITA-KU, OSAKA CITY | 06-XXXX-XXXX | tanaka@abc.net |
| SABURO KOBAYASHI | YOSHIKO KOBAYASHI | | | XX-XXXX-XXXX | |

1001 (CORRESPONDENCE INFORMATION)

| UPPER-ORDER TYPE (LABEL) | NAME(A) | GEOGRAPHIC NAME(B) | CONTACT ADDRESS(X) | | DIVISION(E) |
|---|---|---|---|---|---|
| LOW-ORDER TYPE (LABEL) | | | E-MAIL ADDRESS(C) | TELEPHONE NUMBER(D) | |

FIG. 10

1101 (TEXT DATA)

YAMADA LIVES IN MEGURO-KU, TOKYO. TELEPHONE NUMBER IS 03-1234-XXXX. KATO LIVES IN SETAGAYA-KU, AND PORTABLE PHONE NUMBER IS 090-2222-XXXX.
NAKAGAWA LIVES IN AKASHI CITY, HYOGO PREFECTURE.
TELEPHONE NUMBER IS UNKNOWN. OTHERS WHO ARE KNOWN ARE AS FOLLOWS.
 FUJII KYOTANABE CITY, KYOTO       075-333-XXXX

UEDA  DITTO                         075-222-XXXX

SECTION CHIEF TAKAHASHI  IKEDA CITY, OSAKA   072-777-XXXX

FIG. 11

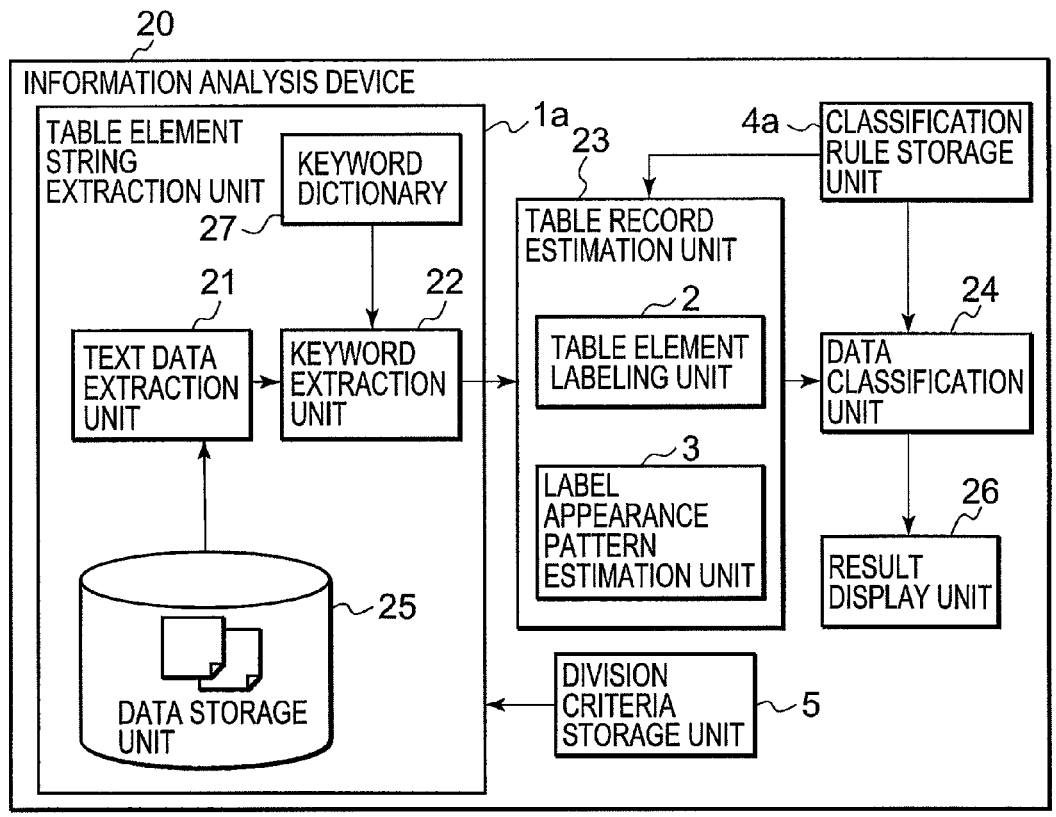

FIG. 12

27 (KEYWORD DICTIONARY)

| TYPE OF KEYWORD | KEYWORD |
|---|---|
| NAME | UEDA, KATO, KOBAYASHI, SUZUKI, TAKAHASHI, NAKAGAWA, FUJII, YAMADA··· |
| GEOGRAPHIC NAME | HOKKAIDO, AOMORI, AKITA, IWATE, YAMAGATA, MIYAGI··· |
| DIVISION | SALES AND MARKETING, PLANNING, ACCOUNTING, PRODUCT DEVELOPMENT, RESEARCH AND DEVELOPMENT··· |

FIG. 13

1401 (CLASSIFICATION RULE)

| CLASSIFICATION RULE NAME | RULE |
|---|---|
| OWN DIVISION CONTACT ADDRESS | DIVISION = "PRODUCT DEVELOPMENT" |
| OTHER DIVISION CONTACT ADDRESS | DIVISION! = "NULL "&& DIVISION! = "PRODUCT DEVELOPMENT" |

FIG. 14

1501 (LIST OF KEYWORDS)

```
YAMADA, 0~4, 0
TOKYO, 10~16, 6
MEGURO-KU, 16~22, 0
03-1234-XXXX, 44~56, 22
KATO, 62~66, 6
SETAGAYA-KU, 72~80, 6
090-2222-XXXX , 98~121, 18
· · · · ·
```

FIG. 15

| DOCUMENT FILE NAME | TOTAL OF CONTACT ADDRESSES | OWN DIVISION CONTACT ADDRESS | OTHER DIVISION CONTACT ADDRESS | OTHER CONTACT ADDRESS |
|---|---|---|---|---|
| abc.doc | 6 | 0 | 0 | 6 |
| LIST OF PARTICIPANTS.xls | 53 | 48 | 4 | 1 |
| foo.pdf | 1 | 0 | 1 | 0 |

2001 (CLASSIFICATION RULE)

| CLASSIFICATION RULE NAME | RULE |
|---|---|
| OWN DIVISION CONTACT ADDRESS | DIVISION = "PRODUCT DEVELOPMENT" && CONTACT ADDRESS! = NULL |
| OTHER DIVISION CONTACT ADDRESS | DIVISION! = NULL && DIVISION! = "PRODUCT DEVELOPMENT" && CONTACT ADDRESS! = NULL |
| OTHER CONTACT ADDRESS | CONTACT ADDRESS! = NULL |

FIG. 20

2101 (TEXT DATA)

CONTACT YAMADA OF PLANNING BY TELEPHONE 03-XXXX-XXXX. CONTACT TANAKA OF PRODUCT DEVELOPMENT BY TELEPHONE 06-XXXX-XXXX OR BY E-MAIL tanaka@abc.net. CONTACT OTHERS BY E-MAIL. E-MAIL ADDRESSES ARE koba@sample.com, a-sato@sample.com, takahashipsample@sample.com, ohta56@abc.net.

FIG. 21

2201 (CLASSIFICATION RESULT)

| DOCUMENT FILE NAME | TOTAL OF CONTACT ADDRESSES | OWN DIVISION CONTACT ADDRESS | OTHER DIVISION CONTACT ADDRESS | OTHER CONTACT ADDRESSES |
|---|---|---|---|---|
| xxxxx.txt | 6 | 1 | 1 | 4 |

FIG. 22

INFORMATION CLASSIFICATION DEVICE, INFORMATION CLASSIFICATION METHOD, AND INFORMATION CLASSIFICATION PROGRAM

This Invention is based on and claims the benefits of priority of Japanese Patent Application No. 2006-146148 filed on May 26, 2006, and Japanese Patent Application No. 2007-125612 filed on May 10, 2007, which are incorporated herein by reference in their entirety.

TECHNICAL FIELD

This invention relates to an information classification device, an information classification method, and an information classification program each for estimating individual records from a keyword string which can potentially take a table format.

BACKGROUND ART

In most of existing organizations represented by general companies, there are a great volume of documents describing personnel information, customer information, financial information, facility information, and the like individually or in combination. A recent trend of enforcing a personal information protection law and enacting Japanese Sarbanes-Oxley (SOX) act has increased a need to classify, manage and protect many of such in-organization documents by sorting them out more strictly than before. Compared with a document describing customer information for only one person or financial information for only one division, a document describing a plurality of pieces of customer information or financial information together generally causes a greater damage when leaked or lost, and thus is considered to be a more important document in most cases. In the case of describing many pieces of information of specific types such as customer information or financial information, individual pieces of information are normally listed in a table format. Thus, a capability of correctly detecting customer information or financial information from the document using the table format is important for information management.

However, a description method for table data constituting the document using the table format greatly varies depending on how a document file is formatted or how a table is configured. For example, for a certain document, by using software Excel by Microsoft, table data is described in a dedicated table format called Excel book format. For another document, since a table format called a hyper text markup language (HTML) format is employed for description to allow reading by a web browser, table data is described by using HTML-specific tags. Thus, the table data in the documents is described by using structure information dedicated to the respective file formats, and an element configuration varies from one piece of table data to another.

Thus, a conventional method of detecting table data or records described in various formats from documents has been disclosed in, for example, Patent Document 1 (Japanese Patent Application Laid-open No. 2003-150624). In Patent Document 1, there is disclosed a method of analyzing structure of table data based on a TABLE tag, a TR tag, or the like when an HTML document is a target, and extracting the table data by using a structure analysis method dedicated to software such as Excel similarly when the Excel document is a target. Also available is a method of describing table data having no clear dividing lines as a table and listing elements by a text editor. This method is disclosed in, for example, Patent Document 2 (Japanese Patent Application Laid-open No. Hei 9-282208). In Patent Document 2, there is disclosed a method of identifying individual records to extract elements of table data by predefining patterns of text data for identifying heads and tails of the records constituting the table data.

However, the conventional methods described above have the following problems.

A first problem is that preparation of individual table structure analysis methods corresponding to various file formats is not generally easy because detailed specifications of the file formats may not be available.

A second problem is that, when software for creating documents or file formats themselves are different in version while file extensions are similar, a structure describing method for table data may vary, and each new future file format will have to be dealt with.

A third problem is that the conventional method of detecting the record by using not the file format but the text data description pattern necessitates, though not depending on the file format, a user to know all the record description patterns of the individual table data beforehand, and thus it is difficult to apply this conventional method to documents containing various types of table data described by many people or systems.

An exemplary object of this invention is to provide an information classification device, an information classification method, and an information classification program each for accurately estimating individual records constituting table data even when there is no prior knowledge of file formats of the data or identification patterns of the records constituting the table data.

DISCLOSURE OF THE INVENTION

According to this invention, there is provided an information classification device for analyzing a configuration of data containing character information. The information classification device includes: a character information extraction unit for extracting predetermined character strings from the character information of the data; a labeling unit for converting the extracted character strings into a series of label strings by replacing each of the character strings with a label indicating a class of the character string; and a label appearance pattern estimation unit for estimating an appearance pattern of the label repeatedly appearing in the label strings.

It should be noted that there can be provided an information classification system, including: the information classification device described above; and at least one data accumulation unit connected to the information classification device via a communication network to store data obtained through the communication network. In this case, the character information extraction unit of the information classification device extracts the predetermined character strings from the character information of the data stored in the data accumulation unit.

Further, according to this invention, there is provided an information classification method for analyzing a configuration of data containing character information. The information classification method includes: extracting predetermined character strings from the character information of the data; converting the extracted character strings into a series of label strings by replacing each of the character strings with a label indicating a class of the character string; and estimating an appearance pattern of the label repeatedly appearing in the label strings.

Further, according to this invention, there is provided an information classification program for controlling a computer to execute analysis of a configuration of data containing character information. The information classification program controls the computer to execute: character information extraction processing of extracting predetermined character strings from the character information of the data; labeling processing of converting the extracted character strings into a series of label strings by replacing each of the character strings with a label indicating a class of the character string; and label appearance pattern estimation processing of estimating an appearance pattern of the label repeatedly appearing in the label strings.

According to this invention as described above, based on the label appearance pattern, the configuration of the data containing the character information can be estimated. In other words, the information classification device according to this invention includes: the character information extraction unit for extracting the predetermined character strings from the character information of the data; the labeling unit for converting the extracted character strings into a series of label strings by replacing each of the character strings with the label indicating the class of the character string; and the label appearance pattern estimation unit for estimating the appearance pattern of the label repeatedly appearing in the label strings. Thus, even when there is no prior knowledge of file formats of the data or identification patterns of the records constituting the table, when an incomplete table in which individual record elements are partially omitted is a target, or when one record includes a plurality of lines, a configuration based on the data class can be accurately estimated from the label appearance pattern.

BRIEF DESCRIPTION OF THE DRAWINGS

FIG. 3 is a flowchart illustrating an operation of the table record estimation device illustrated in FIG. 1.

FIG. 4 is an explanatory diagram illustrating an example of table data contained in text data entered in a first example of the table record estimation device illustrated in FIG. 1.

FIG. 5 is an explanatory diagram illustrating an example of a label of each type of a keyword in the first example.

FIG. 10 is an explanatory diagram illustrating an example of a label of each type of a keyword in the third example.

FIG. 11 is an explanatory diagram illustrating an example of text data entered according to a second exemplary embodiment of this invention.

FIG. 12 is a block diagram illustrating a configuration of an information analysis device which is the second exemplary embodiment of the information classification device of this invention.

FIG. 13 is an explanatory diagram illustrating an example of a keyword dictionary according to the second exemplary embodiment.

FIG. 14 is an explanatory diagram illustrating an example of a classification rule according to the second exemplary embodiment.

FIG. 15 is an explanatory diagram illustrating an example of a keyword string extracted from the text data entered according to the second exemplary embodiment.

FIG. 20 is an explanatory diagram illustrating another example of the classification rule according to the second exemplary embodiment.

FIG. 21 is an explanatory diagram illustrating an example of text data entered according to the second exemplary embodiment.

FIG. 22 is an explanatory diagram illustrating an example of a classifying result according to the second exemplary embodiment.

BEST MODE FOR EMBODYING THE INVENTION

First Exemplary Embodiment

Figure 1:
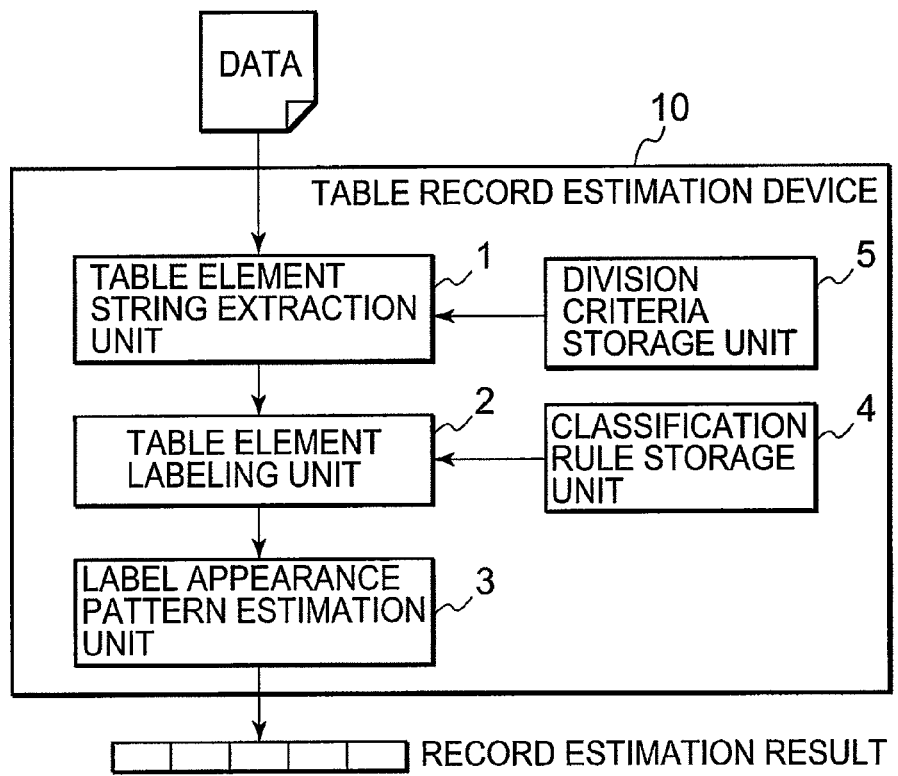
FIG. 1 is a block diagram illustrating a functional configuration of a table record estimation device which is a first exemplary embodiment of an information classification device according to this invention.

Referring to the drawings, a first exemplary embodiment of this invention will be described.

Configuration of First Exemplary Embodiment

FIG. 1 is a block diagram illustrating a functional configuration of a table record estimation device which is a first exemplary embodiment of an information classification device of this invention.

Referring to FIG. 1, a table record estimation device 10 includes a table element string extraction unit (table element string extracting means) 1, a table element labeling unit (table element labeling means) 2, a label appearance pattern estimation unit (label appearance pattern estimating means) 3, a classification rule storage unit (classification rule storing means) 4, and a division criteria storage unit (division criteria storing means) 5.

The table element string extraction unit 1 has a function of entering data to extract text data, and a function of obtaining a series of keywords which become table (table data) elements from the extracted text data. The data whose text data is extracted by the table element string extraction unit 1 may include, for example, a document of a table format or an execution program file as a target, and there is no particular limitation on types of data.

In other words, the table element string extraction unit 1 has a function of extracting from the text data, by referring to the text data extracted from the entered data, a set of elements capable of constituting the table (table data).

As for methods of extracting text data from data in the table element string extraction unit 1, there are available a method for extracting text data by removing display control information (e.g., tag information in HTML document) such as layout information or ruled-line information of table data from the data, and a method for extracting binary data which matches a character code of a specific type such as ASCII or JIS. In the case of the latter method, target data can be not only a document file created by a word processor or a text editor but also an execution program file capable of containing text data.

The table element string extraction unit 1 judges, based on a division criterion stored in the division criteria storage unit 5, whether the extracted keywords are keywords constituting the same table data. The table element string extraction unit 1 executes such character information extraction processing as described above, and may accordingly be called character information extracting means.

The table element labeling unit 2 has a function of labeling, based on correspondence information stored in the classification rule storage unit 4, the individual keywords obtained by the table element string extraction unit 1 by types.

In other words, the table element labeling unit 2 has a function of converting, for one set of elements extracted from the text data, the set of elements into a series of label strings by replacing the elements with labels of types based on the correspondence information stored in the division rule storage unit 4. The table element labeling unit 2 executes such labeling processing as described above, and may accordingly be called labeling means.

The label appearance pattern estimation unit 3 executes the label appearance pattern estimation processing described above, and has a function of estimating a label permutation constituting one-unit record from a label string attached for each type by the table element labeling unit 2, and outputting the label permutation as a record estimation result.

In other words, the label appearance pattern estimation unit 3 has a function of detecting a repeated pattern where a label of the same type appears from the obtained label string, and judging a unit-label string of one repeated pattern as a record indicating one-unit information.

The classification rule storage unit 4 has a function of storing correspondence information (classification rule) indicating correspondence between various keywords and labels. The classification rule storage unit 4 executes such correspondence information storage processing as described above, and may accordingly be called correspondence information storing means.

The division criteria storage unit 5 has a function of storing a division criterion indicating a criterion as to whether the extracted keywords belong to the same table data.

Figure 2:
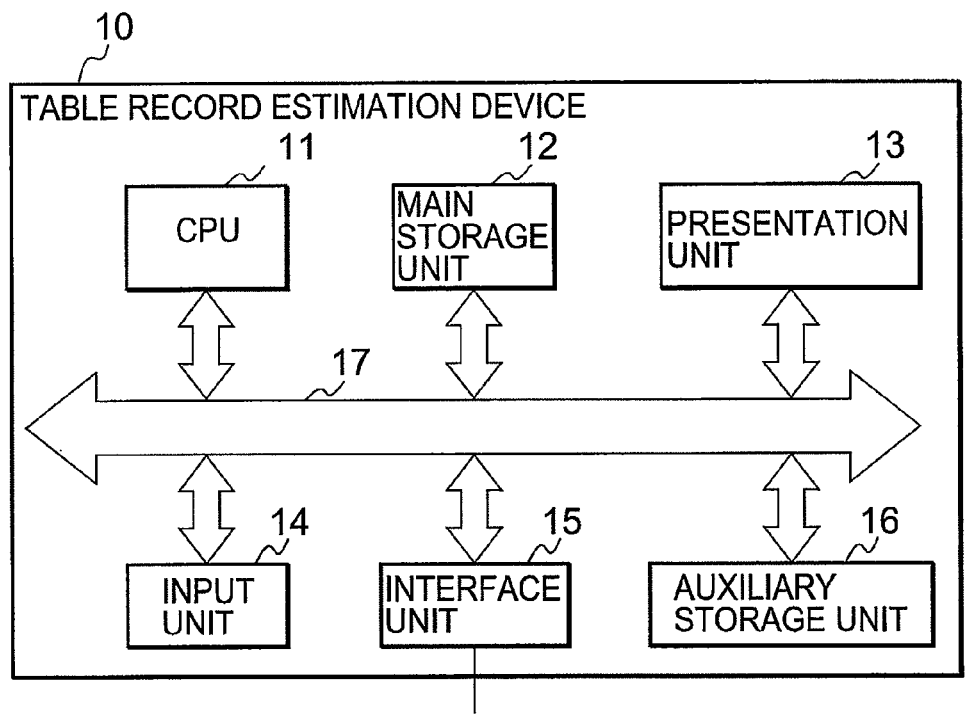
FIG. 2 is a block diagram illustrating a hardware configuration of the table record estimation device illustrated in FIG. 1.

FIG. 2 is a block diagram illustrating a hardware configuration of the table record estimation device 10.

Referring to FIG. 2, the table record estimation device 10 can be realized by a hardware configuration similar to that of a general computer. The table record estimation device 10 includes a central processing unit (CPU) 11, and a main storage unit 12 which is a main memory such as a random access memory (RAM) and used as a data working area or a temporary data saving area. The table record estimation device 10 includes output means such as a liquid crystal display, a printer, and a speaker (collectively called presentation unit 13), and input means such as a keyboard, a mouse, and a scanner (collectively called input unit 14). The table record estimation device 10 further includes an interface unit 15 connected with peripheral devices to transmit/receive data, an auxiliary storage unit 16 which is a hard disk device including a read only memory (ROM), a magnetic disk, and a nonvolatile memory such as a semiconductor memory, and a system bus 17 for interconnecting the components.

The table record estimation device 10 can realize the functions not only in hardware manner by mounting a circuit component including a hardware member of large scale integration (LSI) incorporating programs for realizing the functions including operations described below, but also in software manner by executing programs for providing the functions of the components on the CPU 11 of the computer.

In other words, the CPU 11 loads the program stored in the auxiliary storage unit 16 to the main storage unit 12, and executes the program to control an operation of the table record estimation device 10, thereby realizing each of the functions in software manner. The program may be stored in a portable storage medium readable by the CPU 11.

An information analysis device of each of second and third exemplary embodiments described below is configured by hardware similar to that of the table record estimation device 10 so that predetermined functions can be realized by hardware or software.

Operation of First Exemplary Embodiment

FIG. 3 is a flowchart illustrating an operation of the table record estimation device 10.

The table record estimation device 10 estimates table records by a procedure illustrated in FIG. 3. First, the table element string extraction unit 1 extracts text data from entered data (Step S101), and obtains a series of keyword strings constituting one table data from the extracted text data as a set of keywords (partial character string set) (Step S102).

As for a method of obtaining the keyword strings in Step S102, for example, there are available a method for extracting a character string if the character string matching keywords included in a dictionary prepared beforehand in the storage unit of the table element string extraction unit 1 is found in the text data, and a method for executing morphological analysis of the text data, and extracting all names or geographic names among proper nouns enabling specifying of character information. Additionally, there is available a method for obtaining a telephone number, an E-mail address, a company name, a school name, or a product name having a specific format by extracting a character string which matches a certain pattern defined in regular expression.

A breakpoint of the keyword string within a range of one table data can be judged, for example, based on a distance between adjacent keywords. In other words, presuming, as a division criterion, that a maximum permissible distance (capacity) between keywords contained in the same table data is 100 bytes, as long as a distance between a certain keyword extracted from text data and another keyword extracted next is within 100 bytes in data length, based on the division criterion, the table element string extraction unit 1 judges that the two keywords are one set of keywords (one partial character string set) constituting the same table data.

Then, the table element labeling unit 2 replaces the keyword string constituting one table data obtained in Step S102 with a label for each type based on the correspondence information stored in the classification rule storage unit 4 (Step S103).

In the classification rule storage unit 4, for example, if labels corresponding to types of keywords are predefined in a manner of a name A and an address B among the keywords, the table element labeling unit 2 replaces a name YAMADA or SUZUKI with a label A and a geographic name KYOTO or NAGOYA with a label B. When such replacement processing is applied to all the keywords, a series of keyword strings becomes a label string in Step S103.

Then, if adjacent ones in the label string obtained in Step S103 are labels of the same type, the table element labeling unit 2 collects the labels into one label (Step S104). For example, a label string of AABBBC becomes a label string of ABC after collection.

In this case, when each keyword is replaced with a label in Step S103, if a label that has replaced a certain keyword is similar to a label which has replaced a keyword immediately before the keyword, by deleting the label when the keyword is replaced, the table element labeling unit 2 can simultaneously execute Steps S103 and S104.

Thus, after formation of the label string where two or more labels of the same type do not continue in Step S104, the label appearance pattern estimation unit 3 reads (detects) labels starting from a head of the label string, and stores, when a label of the same type as that of the detected label is detected again, a series of labels immediately before as candidate records (Step S105). For example, when there is a label string of "ABCABDCA . . . ", A, B, and C are read from the head and, next time A is detected again, a label string "ABC" immediately before is set as a first candidate record.

Subsequently, the label appearance pattern estimation unit 3 reads A and B again from the second A. However, from here on, the label appearance pattern estimation unit 3 reads the labels while comparing them with the candidate record "ABC" stored in Step S105. For example, when a new label D is detected after AB, the label D is inserted after AB on the candidate record, and a new candidate record is stored as "ABDC" (Step S106).

Then, the label appearance pattern estimation unit 3 detects, for example, C after D, and when detecting A for the third time, for a reason that there is no difference from the new candidate record "ABDC" stored in Step S106, uses the new candidate record "ABDC" directly for subsequent Steps.

Thereafter, the label appearance pattern estimation unit 3 updates the candidate record while similarly comparing latest candidate record with the labels in the label string obtained in Step S104 in sequence, and estimates (determines) a latest candidate record obtained as a result of reading to the last of the label string obtained in Step S104 as a label string indicating a record configuration of the table data (Step S107).

Effects of First Exemplary Embodiment

According to the first exemplary embodiment, even when there is no prior knowledge of a file format of the data or identification pattern of a record constituting the table data, types and a configuration order of the individual records constituting the table data can be accurately estimated. Thus, predetermined information such as customer information or financial information can be correctly detected from the data. The reason is as follows. The table record estimation device 10 extracts text data from entered data, and extracts a series of keywords from the extracted text data. In this case, the processing is not affected by various file formats, nor there is any need to know beforehand all data description patterns of records in individual table data. Then, the series of keywords extracted from the data containing various types of table data described by many people and systems are replaced with labels corresponding to keyword types. Subsequently, based on a repeated pattern where a label of the same type appears for a label string generated by collecting adjacent labels of the same type, the label string is judged as a record indicating one-unit information of one repeated pattern.

First Example of First Exemplary Embodiment

Referring to the drawings, a first example of the first exemplary embodiment will be described. The first example is application of this invention to the first exemplary embodiment, describing the first exemplary embodiment by a more specific example. An outline of a configuration and an operation of the first example is similar to that of the configuration and the operation of the first exemplary embodiment, and thus overlapped portions will be omitted for description as occasion demands.

Operation of First Example

In the first example, it is presumed that table data 401 illustrated in FIG. 4 has been described in certain data. By using the table element string extraction unit 1, a character string constituting this table data 401 is extracted as text data, and keywords matching types such as a name and a geographic name illustrated in FIG. 5 are extracted from the text data (refer to Steps S101 and S102 of FIG. 3).

If correspondence information 501 indicating correspondence between various keywords and labels illustrated in FIG. 5 is, for example, a name, by applying a label A, the extracted keyword string is replaced with a label string by the table element labeling unit 2 (refer to Step S103 of FIG. 3).

In other words, from the table data 401 of FIG. 4, by the table element string extraction unit 1, a keyword string of a name (TARO YAMADA), a name (HANAKO YAMADA), a geographic name (TOKYO), a geographic name (MINATO-KU), and an E-mail address (taro@sample.com) is extracted from a second line, a keyword string of a name (JIRO TANAKA), a geographic name (OSAKA), a geographic name (OSAKA CITY), a geographic name (KITA-KU), a telephone number (06-XXXX-XXXX), and an E-mail address (tanaka@abc.net) is extracted from a third line, and a keyword string of a name (SABURO KOBAYASHI), a name (YOSHIKO KOBAYASHI), and a telephone number (XX-XXXX-XXXX) is extracted from a fourth line (refer to Step 102 of FIG. 3). Subsequently, based on the correspondence information 501 illustrated in FIG. 5, by the table element labeling unit 2, the keyword string is replaced with a label string {AABBCABBBDCMD} (refer to Step S103 of FIG. 3).

Figures 6, 7:
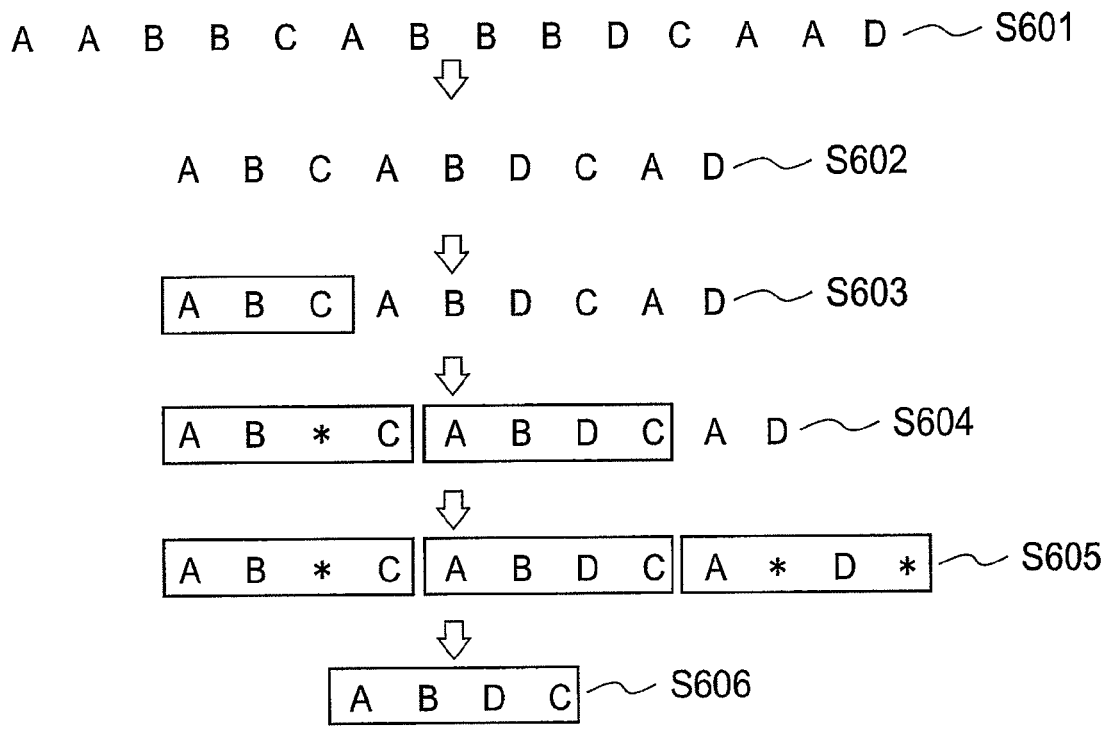
FIG. 6 is an explanatory diagram illustrating a series of flows for estimating a label string indicating a record configuration of the table data from a label string which has replaced a keyword string constituting the table data in the first example.
FIG. 7 is a diagram illustrating output information of a last record estimation result in the first example.

FIG. 6 is a diagram illustrating, corresponding to the flowchart of FIG. 3, a series of flows for estimating a label string indicating a record configuration of the table data from the label string which has replaced the keyword string constituting the table data.

First, the keyword string extracted from the table data of FIG. 4 by the table element string extraction unit 1 (refer to Step S102 of FIG. 3) is replaced with an initial label string (Step S601) by the table element labeling unit 2 based on the correspondence information illustrated in FIG. 5 (refer to Step S103 of FIG. 3). For the obtained initial label string, if labels of the same type among adjacent labels are corrected into one, a label string {ABCABDCAD} is obtained (Step S602).

When the label appearance pattern estimation unit 3 reads the label string {ABCABDCAD} obtained in Step S602, as described above in the first exemplary embodiment, sequentially from a head (refer to Step S105 of FIG. 3), a first candidate record "ABC" is obtained (Step S603). Further, as in the case of the first exemplary embodiment (refer to Step S106 of FIG. 3), a second candidate record "ABDC" is obtained (Step S604). In Step S604 of FIG. 6, for the first candidate record "ABC", an asterisk "*" indicating a NULL value is set in a position corresponding to a label D present in the second candidate record "ABDC" but not present in the first candidate record "ABC". Thereafter, it is presumed that the label of the asterisk "*" is a label not actually present but having an element omitted corresponding to the candidate records.

Then, in FIG. 6, as in the case of the first exemplary embodiment, when labels are read sequentially from the third label A with a left end of the label string obtained in Step S602 set as a head, D is detected after A. Latest candidate record at this time is "ABDC" (refer to Step S604). Thus, the label appearance pattern estimation unit 3 directly correlates, judging that an element equivalent to the label B is absent in the third record, the next label D with the D detected from the label string. For the label B judged to be absent, in FIG. 6, an asterisk "*" is described as a temporary label according to the aforementioned policy. The label string of this example finishes at the D detected for the second time. The label appearance pattern estimation unit 3 accordingly estimates (determines) that a last label C of the latest candidate record "ABDC" is also absent from a third record. Thus, according to the policy, the label is represented by an asterisk "*" (Step S605).

Through the aforementioned steps, the label appearance pattern estimation unit 3 sets the candidate record "ABDC" as a last record estimation result {Step S606 (refer to Step S107 of FIG. 3)}.

For the records of the estimation result, by the label appearance pattern estimation unit 3, without omitting any one of the labels which become elements from the original label string, the label string is divided into one or more records.

FIG. 7 is a diagram illustrating output information of a last record estimation result.

FIG. 7 is a diagram illustrating output information 701 indicating the last record estimation result "ABDC" set in Step S606 corresponding to a type of a keyword based on the correspondence information 501 illustrated in FIG. 5. Referring to FIG. 7, a record configuration of the table data can be estimated based on the output information 701.

Effects of First Example

According to the method for estimating a series of table records in the operation of the table record estimation device 10 of the first example, by replacing the keyword strings of the text data with the label string one to one based on the correspondence information indicating correspondence, records are estimated from only a one-dimensional label string. Thus, without any dependence on how seeming table data is structured, or even when a keyword of each type appears or doesn't appear in the keyword string, records can be estimated.

According to the first example, for example, even when the table data of FIG. 4 has a record configuration of a set of two lines where {name, joint name, and address} are described in a first line and {telephone number and E-mail address} are described in a second line, a label string to be obtained here is similar to that obtained in Step S601 of FIG. 6, and thus there is an effect of preventing any influence on a record estimation result even if a structure of the table data varies.

Second Example of First Exemplary Embodiment

Next, a second example of the first exemplary embodiment will be described. The second example is a modified example of the first example, and an outline of a configuration and an operation is similar to that of the configuration and the operation of the first exemplary embodiment. Thus, differences from the first example will mainly be described.

Operation of Second Example

Figures 8, 9:
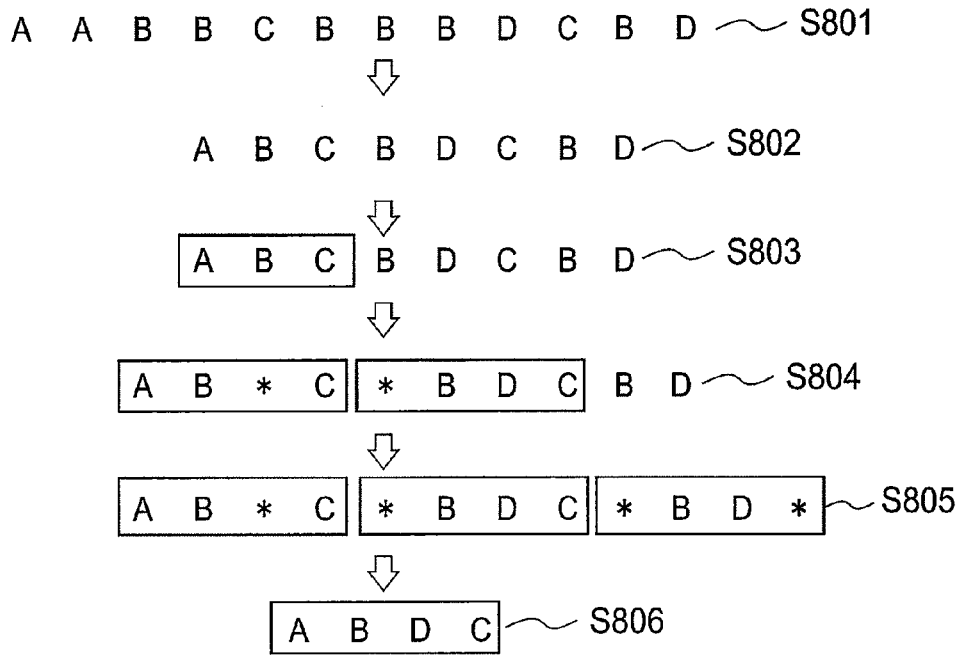
FIG. 8 is an explanatory diagram illustrating a series of flows for estimating a label string indicating a record configuration of table data from a label string which has replaced a keyword string constituting the table data in a second example of the table record estimation device illustrated in FIG. 1.
FIG. 9 is an explanatory diagram illustrating an example of table data contained in text data entered in a third example of the table record estimation device illustrated in FIG. 1.

FIG. 8 is a diagram illustrating a modified example of FIG. 6, and illustrating, corresponding to the flowchart of FIG. 3, a series of flows for estimating a label string indicating a record configuration of table data from a label string which has replaced the keyword string constituting the table data.

First, the keyword string extracted by the table element string extraction unit 1 is replaced with an initial label string by the table element labeling unit 2 based on the correspondence illustrated in FIG. 5 (Step S801). When labels of the same type among adjacent labels are collected into one for the obtained initial label string, a label string {ABCBDCBD} is obtained (Step S802).

The label appearance pattern estimation unit 3 reads, as in the case of the first exemplary embodiment, the label string {ABCBDCBD} obtained in Step S802 sequentially from the head. In this case, because the label "B" appears again after the label "C" without detection of any label "A" at the point of time of detecting "A→B→C→B", the label of the same type as that of the detected label is detected for the second time. In this case, the label appearance pattern estimation unit 3 stores a series of labels "ABC" immediately before as a candidate record (refer to Step S105). In other words, the label appearance pattern estimation unit 3 estimates, judging that, for "ABCB", "ABC" and "B" belong to different records, a first candidate record to be "ABC" (Step S803).

In this case, referring to FIG. 6, if processing similar to Step S803 is executed, the label appearance pattern estimation unit 3 sets the candidate record "ABDC" as a last record estimation result (Steps S804 to S806).

Effects of Second Example

According to the method for estimating a series of table records in the operation of the table record estimation device 10 of the second example, for example, even when a label which becomes a reference for reading a label string, such as a head "A", does not always appear in each record of the label string, effects similar to those of the first exemplary embodiment can be obtained.

Third Example of First Exemplary Embodiment

Referring to the drawings, a third example of the first exemplary embodiment will be described. The third example is a modified example of the first or second example, and classifies table data to be entered based on a high-order or low-order configuration. An outline of a configuration and an operation of the third example is similar to that of the configuration and the operation of the first exemplary embodiment, and thus differences from the first and second examples will mainly be described.

Configuration of Third Example

FIG. 9 illustrates a modified example of FIG. 4. Table data 901 illustrated in FIG. 9 correlates, for "ADDRESS", "PREFECTURE" and "CITY, WARD, TOWN, VILLAGE" as classes indicating concepts narrower than "ADDRESS", and, for "E-MAIL ADDRESS" and "TELEPHONE NUMBER", "CONTACT ADDRESS" as a class indicating a concept broader than "E-MAIL ADDRESS" and "TELEPHONE NUMBER". FIG. 10 illustrates a modified example of FIG. 5. Correspondence information 1001 illustrated in FIG. 10 correlates, for "TELEPHONE NUMBER" (label D) and "E-MAIL ADDRESS" (label C), a label X indicating "CONTACT ADDRESS" as a class indicating a concept broader than "TELEPHONE NUMBER" (label D) and "E-MAIL ADDRESS" (label C). Stated differently, for "CONTACT ADDRESS" (label X), "TELEPHONE NUMBER" (label D) and "E-MAIL ADDRESS" (label C) are correlated as classes indicating concepts narrower than "CONTACT ADDRESS" (label X).

Operation of Third Example

In the third example, for the estimation result "ABDC" shown in Step S606 of FIG. 6 or Step S806 of FIG. 8, based on the table data 901 illustrated in FIG. 9 or the correspondence information 1001 illustrated in FIG. 10, "ABX" becomes a last record estimation result.

Effects of Third Example

According to the third example, types of extracted keywords can be optionally correlated with types indicating a high-order concept collecting types of extracted plurality of keywords or types indicating a low-order concept classifying types of extracted keywords in detail in a hierarchical manner. Thus, a configuration of entered data can be estimated based on an optional hierarchy.

Second Exemplary Embodiment

A second exemplary embodiment of this invention does not necessitate preparation of individual table structure analysis methods corresponding to various file formats or an appearance of a record description pattern strictly corresponding to table data. In other words, the second exemplary embodiment enables estimation of a record as in the case of the first example even from text data 1101 including only a list of natural language sentences or phrases illustrated in FIG. 11. This will be described below. Portions of the second exemplary embodiment similar to those of the first exemplary embodiment and the first example will be omitted for description as occasion demands.

Configuration of Second Exemplary Embodiment

FIG. 12 is a block diagram illustrating a configuration of an information analysis device which is a second exemplary embodiment of the information classification device of this invention.

Referring to FIG. 12, an information analysis device 20 includes a table element string extraction unit (character information extracting means) 1a having a function similar to that of the table element string extraction unit 1 of the first exemplary embodiment, and a table record estimation unit 23 which includes the table element labeling unit 2 and the label appearance pattern estimation unit 3 of the first exemplary embodiment. The information analysis device 20 includes a data classification unit 24 having a function of classifying a keyword string by collating a string of types of keywords obtained from records estimated by the table record estimation unit 23 with a classification rule stored in a classification rule storage unit (correspondence information storing means) 4a. The information analysis device 20 further includes a result display unit (result outputting means) 26 having a function of displaying a predetermined result indicated by the keyword string classified by the data classification unit 24, a classification rule storage unit 4a having a function of storing the classification rule, and the division criteria storage unit 5 of the first exemplary embodiment.

The table element string extraction unit 1a includes a text data extraction unit (text data extracting means) 21 having a function of referring to data such as a document stored in a data storage unit (data storing means) 25 to extract text data from the data referred to. The table element string extraction unit 1a includes a keyword extraction unit (keyword extracting means) 22 having a function of extracting keywords from the text data extracted by the text data extraction unit 21 based on keyword information stored in a keyword dictionary 27 to generate a keyword string. The table element string extraction unit 1a further includes the data storage unit 25 having a function of storing data such as a document, and the keyword dictionary 27 having a function of storing keyword information defining extracted keywords for each type. The keyword dictionary 27 may be called extraction information storing means, and the keyword information may be called extraction information.

The keyword dictionary 27 is realized by, for example, a configuration illustrated in FIG. 13. In other words, for each keyword type, for a name, a family name "UEDA" or "KATO" and a first name "TARO" or "HANAKO" (not shown) are described in the keyword dictionary 27, and a text character string equivalent to those keywords are extracted from text data by the keyword extraction unit 22.

The classification rule storage unit 4a is realized by storing, in addition to the classification rule stored in the classification rule storage unit 4 of the first exemplary embodiment, for example, a classification rule 1401 having a configuration illustrated in FIG. 14.

Referring to FIG. 14, a classification rule "OWN DIVISION CONTACT ADDRESS" corresponds only to a record where a keyword equivalent to a division is "PRODUCT DEVELOPMENT". A classification rule "OTHER DIVISION CONTACT ADDRESS" corresponds only to a case where in addition to a condition of "DIVISION!="NULL"" indicating inclusion of a certain division (inclusion of label E in the aforementioned example), a condition of "DIVISION!="PRODUCT DEVELOPMENT"" indicating that a keyword equivalent to a division is not "PRODUCT DEVELOPMENT" is satisfied.

Figures 16, 17:
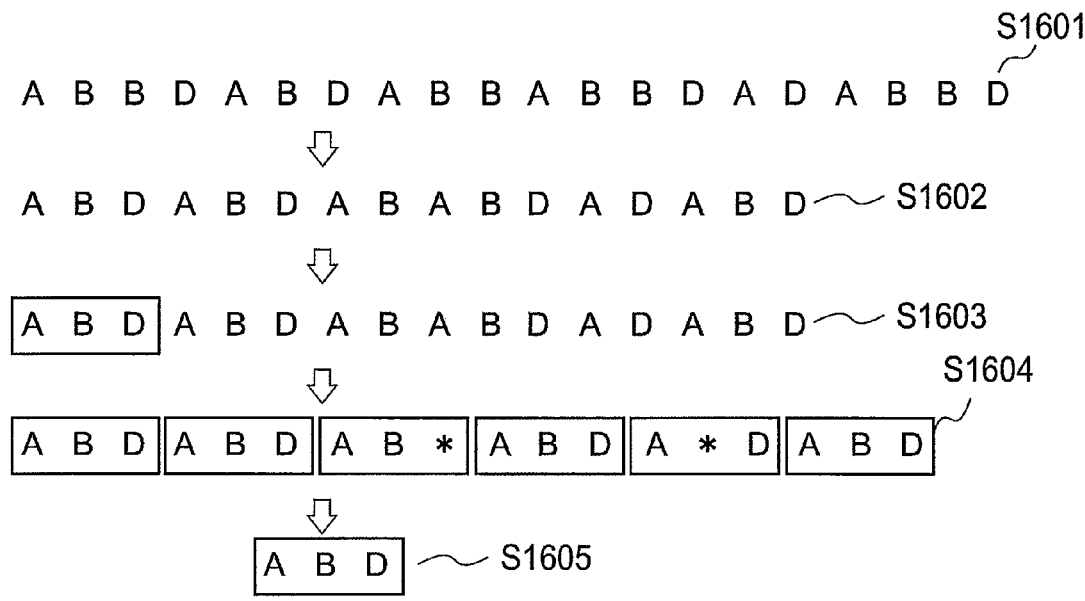
FIG. 16 is an explanatory diagram illustrating a series of flows for estimating a label string indicating a record configuration of table data from a label string which has replaced the keyword string constituting the table data according to the second exemplary embodiment.
FIG. 17 is an explanatory diagram illustrating an example of output data according to the second exemplary embodiment.

The information analysis device 20 can display, based on the classification rule 1401 illustrated in FIG. 14, by replacing the extracted keywords with labels, the number of classified records indicating more detailed classes of the extracted keywords as illustrated in FIG. 17 described below.

Operation of Second Exemplary Embodiment

The information analysis device 20 first refers to data stored in the data storage unit 25 by using the text data extraction unit 21 to extract text data from each data. For a method for extracting text data in the text extraction unit 21, as described above, there are available a method for extracting text data by removing display control information (e.g., tag information in HTML document) such as layout information or ruled-line information of table data from the data, and a method for extracting binary data which matches a character code of a specific type such as ASCII or JIS. In the case of the latter method, target data can be not only a document file created by a word processor or a text editor but also an execution program file capable of containing text data.

Then, the keyword extraction unit 22 extracts keywords of specific types defined in the keyword dictionary 27 from the text data extracted by the text data extraction unit 21 to generate a keyword string. The table record estimation unit 23 executes labeling of each keyword and record estimation by the procedure of the first exemplary embodiment illustrated in FIG. 3. The data classification unit 24 collates a string of types of keywords obtained from a record estimated by the table record estimation unit 23 with a classification rule of the classification rule storage unit 4a to select one suited to a predetermined combination as suitable character information, thereby classifying the keyword string, and displays its result by the result display unit 26. The data classification unit 24 performs such character information classifying processing described above, and may accordingly be called character information classifying means.

According to the second exemplary embodiment, when keywords are extracted from the text data 1101 illustrated in FIG. 11 by the table element string extraction unit 1a based on label definition (correspondence information 501 indicating correspondence) corresponding to the types of keywords illustrated in FIG. 5, a list 1501 of keywords illustrated in FIG. 15 is obtained.

In the list 1501 of keywords illustrated in FIG. 15, in each line, a keyword extracted from text data, a detection position of the keyword, and a distance between the keyword and a keyword immediately before are described in this order. A keyword extraction position is represented by the number of bytes from a head of the text data and the number of bytes at the tail of the keyword. Note, however, one Japanese character has 2 bytes, while one alphanumeric character numerical symbol has 1 byte.

Presuming that a division criterion is 100 bytes, in the text data 1101 illustrated in FIG. 11 and the list 1501 of keywords illustrated in FIG. 15, distances between all the keywords are 100 bytes or less. Thus, the table element string extraction unit 1a judges that all the keywords from "YAMADA" to "TAKAHASHI" constitute the same table data.

A result of replacing the extracted keyword string with a label string by the table element labeling unit 2 of the table record estimation unit 23 based on the correspondence information 501 illustrated in FIG. 5 is as indicated by Step S1601 of FIG. 16. From here, continuous similar labels are collected into one as in the case of the previous example (Step S1602), candidate record estimation is started from a head of the label string (Step S1603) and, when a last of the label string is reached (Step S1604), a label string {ABD} is obtained as a last record estimation result (Step S1605).

The label appearance pattern estimation unit 3 of the table record estimation unit 23 can calculate how many records of information the table data has by counting the number of label strings of one estimated record included in all the label strings illustrated in Step S1604.

The information analysis device 20 can output, by classifying labels (labels indicated by alphabetical capital letters in Step S1604 of FIG. 16) of keywords actually included in each record based on the record estimation result, for example, a classification result 1701 illustrated in FIG. 17.

The information analysis device 20 can output, when entered text data is as illustrated in FIG. 11, a classification result indicating that totally 6 contact addresses have been detected as in the case of abc.doc of a second line of the classification result 1701 of FIG. 17.

For a label for each type of the keyword of the correspondence information 501 illustrated in FIG. 5, a label E indicating a division is defined. According to the second exemplary embodiment, when a label string (e.g., "ABEC") including a label indicating a division in addition to labels indicating a name and a geographic name is obtained from text data entered separately from the text data 1101 illustrated in FIG. 11, the information analysis device 20 can display, as in the case of a third or fourth line of the classification result 1701 illustrated in FIG. 17, the number of pieces such as "OWN DIVISION CONTACT ADDRESS", "OTHER DIVISION CONTACT ADDRESS", and "OTHER CONTACT ADDRESS" which is not including a label indicating a division.

As in the case of the third example, for "OWN DIVISION CONTACT ADDRESS" and "OTHER DIVISION CONTACT ADDRESS", "CONTACT ADDRESS" which is a class of a concept broader than "OWN DIVISION CONTACT ADDRESS" and "OTHER DIVISION CONTACT ADDRESS" may be correlated. In other words, for example, a label "Y" may be correlated with "OWN DIVISION CONTACT ADDRESS", a label "Z" may be correlated with "OTHER DIVISION CONTACT ADDRESS". For "OWN DIVISION CONTACT ADDRESS" (label Y) and "OTHER DIVISION CONTACT ADDRESS" (label Z), a label X indicating "CONTACT ADDRESS" which is a concept broader than "OWN DIVISION CONTACT ADDRESS" (label Y) and "OTHER DIVISION CONTACT ADDRESS" (label Z) may be correlated. Stated differently, as in the case of the third example, for "CONTACT ADDRESS" (label X), "OWN DIVISION CONTACT ADDRESS" (label Y) and "OTHER DIVISION CONTACT ADDRESS" (label Z) are correlated as classes indicating concepts narrower than "CONTACT ADDRESS" (label X).

For example, when a division criterion is 40 bytes, or a configuration changing place in the text data, the text data 1101 illustrated in FIG. 11 and the list 1501 of keywords illustrated in FIG. 15 are divided, by the table element string extraction unit 1a, into table data including keywords from YAMADA to NAKAGAWA, and table data including keywords from FUJII to TAKAHASHI.

Another Operation of Second Exemplary Embodiment

Figure 19:
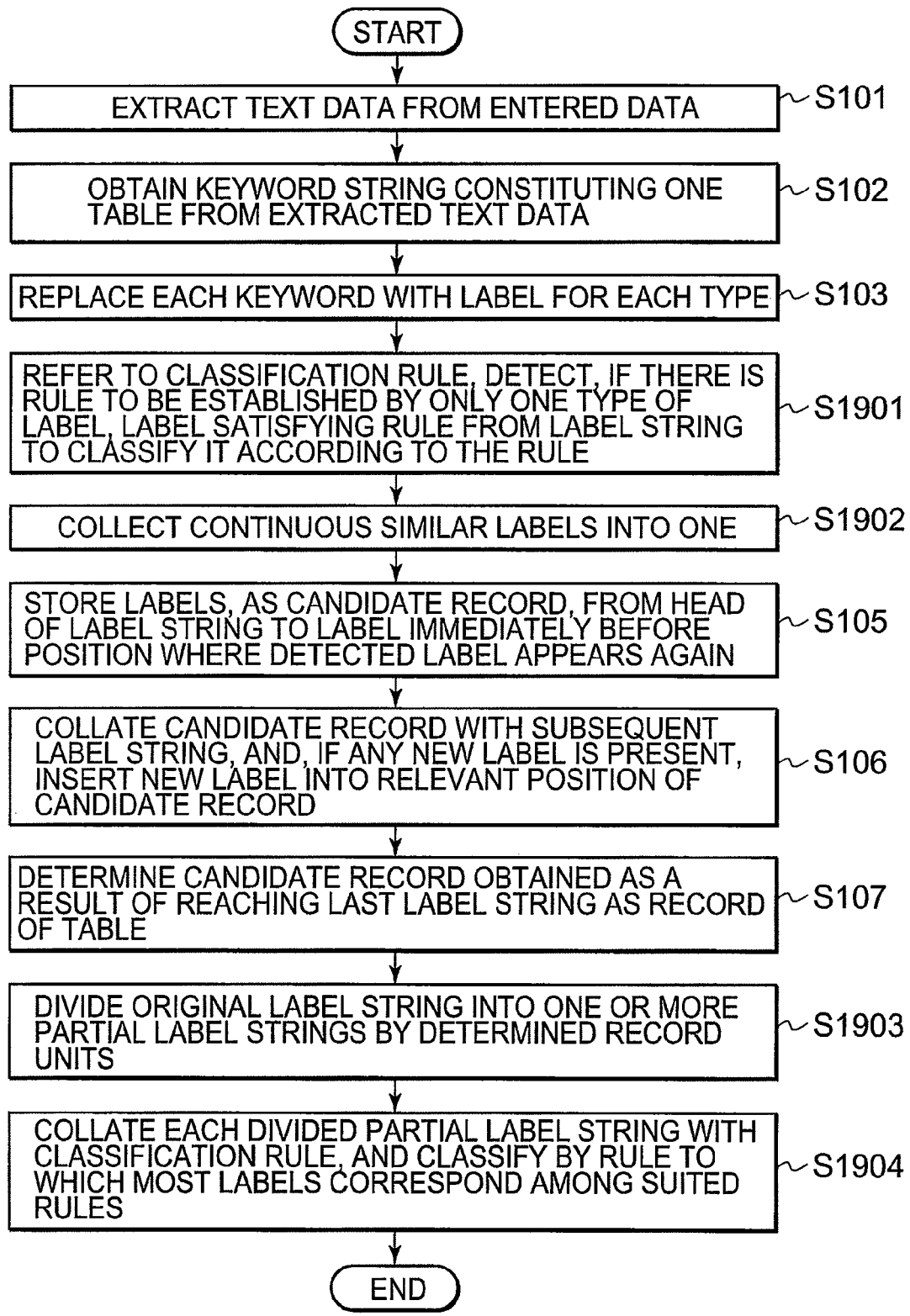
FIG. 19 is a flowchart illustrating another operation example of a table record estimation unit and a data classification unit according to the second exemplary embodiment.

Referring to FIG. 19, another operation of the second exemplary embodiment of this invention will be described.

FIG. 19 is a flowchart illustrating operations of the table record estimation unit 23 and the data classification unit 24 according to the second exemplary embodiment illustrated in FIG. 12.

In the flowchart of FIG. 19, as in the case of the operation of the table record estimation device 10 of the first exemplary embodiment illustrated in FIGS. 1 and 3, first, text data is extracted from entered data (Step S101). Subsequently, a series of keyword strings constituting one table data is obtained from the extracted text data (Step S102).

Then, the table element labeling unit 2 replaces the keyword string constituting one table data obtained in Step S102 with a label for each type based on correspondence information stored in the classification rule storage unit 4*a* (Step S103).

After Step S103, in this case, different from the flowchart of FIG. 3, if reference to classification rules of the classification rule storage unit 4*a* finds a rule to be established by a label of only one type, a label satisfying the rule is detected from a label string, and this label is classified as one class indicated by the rule (Step S1901).

For example, it is presumed that the classification rule of the classification rule storage unit 4*a* includes a classification rule 2001 constituted of a set of three types of rules illustrated in FIG. 20. Among the classification rules, a rule "OTHER CONTACT ADDRESS" is described as "CONTACT ADDRESS!=NULL". This means that if there is even one label equivalent to "CONTACT ADDRESS", this label is classified as "OTHER CONTACT ADDRESS". For such a rule "OTHER CONTACT ADDRESS", when "CONTACT ADDRESS" is defined as in the case of the correspondence information 1001 illustrated in FIG. 10, the rule can be evaluated only by a label equivalent to one type of an E-mail address and a telephone number, and judged to be "OTHER CONTACT ADDRESS" if it is one of them. However, when an E-mail address or a telephone number is included in judging conditions of other classification rules, by giving priority to a classification rule needing more labels in its judging condition, information corresponding to "OTHER DIVISION CONTACT ADDRESS" or "OWN DIVISION CONTACT ADDRESS" in the classification rule 2001 can be appropriately extracted.

After extraction of text data 2101 illustrated in FIG. 21 in Step S101, by the classification rule 2001 of FIG. 20, four continuous E-mail addresses at the tail satisfy the rule "OTHER CONTACT ADDRESS", and thus the classification is executed according to the rule in Step S1901.

After completion of the processing of Step S1901, as in the case of Step S104 of FIG. 3, if adjacent labels in the label string are labels of the same type, the table element labeling unit 2 collects them into one label (Step S1902). Steps S105, S106, and S107 executed after Step S1902 are similar to those of the flowchart of FIG. 3, and thus description thereof will be omitted.

After a series of record strings can be judged from the keyword string constituting one table through the processing up to Step S107, all the label strings are divided into one or more partial label strings corresponding to the judged individual records (Step S1903).

After completion of the processing of Step S1903, the data classification unit 24 collates each divided partial label string with each rule of the classification rule storage unit 4*a* to classify each partial label string by a rule to which most labels correspond among suited rules (Step S1904).

When the text data 2101 illustrated in FIG. 21 is classified through the processing up to Step S1904 by using the correspondence information 1001 of FIG. 10 and the classification rule 2001 of FIG. 20, a result is as shown in a table of FIG. 22. In FIG. 22, one "OWN DIVISION CONTACT ADDRESS" including a division "PRODUCT DEVELOPMENT", a name TANAKA, and a telephone number and an E-mail address as contact addresses, and one "OTHER DIVISION CONTACT ADDRESS" including a division of not "PRODUCT DEVELOPMENT" but "PLANNING", a name YAMADA, and a telephone number as a contact address can be detected, and totally 4 "OTHER CONTACT ADDRESSES" established if there is only a contact address as a high-order concept of an E-mail address can be detected.

Effects of Second Exemplary Embodiment

According to the second exemplary embodiment, from the text data including a string of natural language sentences or phrases, optional information including a combination of specific types of keywords can be detected together with the number of its pieces. In other words, for the combination of specific types of keywords, for example, a plurality of combinations of the same tier such as "OWN DIVISION CONTACT ADDRESS" or "OTHER DIVISION CONTACT ADDRESS" can be simultaneously detected. Those suited to a combination of keywords of different types or tiers where "GEOGRAPHIC NAME" is "MINATO-KU, TOKYO" and "CONTACT ADDRESS" is "PRODUCT DEVELOPMENT" as "OWN DIVISION CONTACT ADDRESS" can be simultaneously detected. Moreover, regarding a classification rule "OTHER DIVISION CONTACT ADDRESS" in the classification rule 1401, a combination simultaneously satisfying, in addition to the conditions "DIVISION!="NULL"" and "DIVISION!="PRODUCT DEVELOPMENT"", a condition of "DIVISION="OSAKA"" indicating a keyword equivalent to the division is "OSAKA" can be detected.

By using the information analysis device 20, for example, by preparing a dictionary defining features of individual information or product information as types of keywords, management can be facilitated by extracting the individual information or the product information from various documents (data) in an organization and sorting out the number of its pieces. Thus, the table record estimation method and the information analysis device using the method according to the second exemplary embodiment are useful for resource management or information security management in an organization such as a company. Based on various division criteria, single or a plurality of table data can be generated from the list 1501 of keywords created from the entered text data 1101.

Third Exemplary Embodiment

A third exemplary embodiment of this invention will be described below. Portions of the third exemplary embodiment similar to those of the first and second exemplary embodiments and the first example will be omitted for description as occasion demands.

Figure 18:
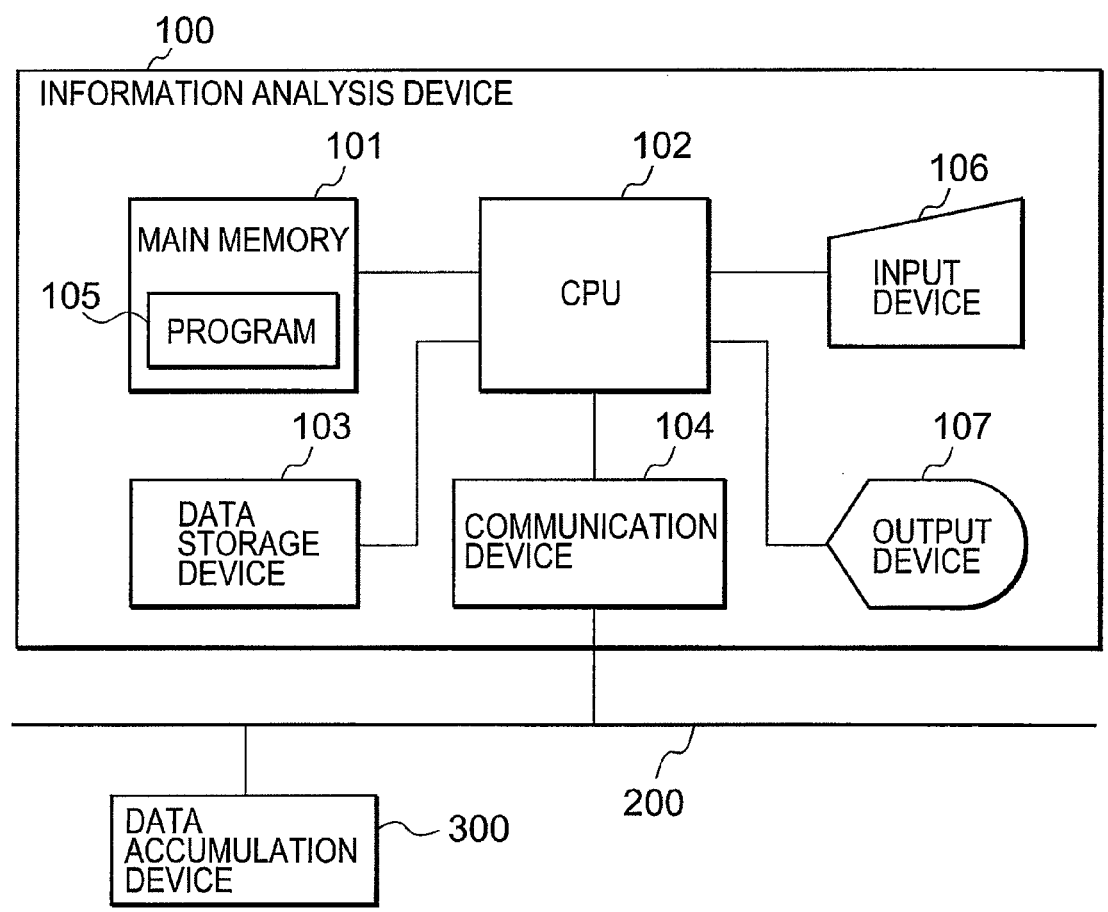
FIG. 18 is a block diagram illustrating a configuration example when an information classification system is configured by using the information classification device of this invention, which illustrates a third exemplary embodiment of the information classification device of this invention.

FIG. 18 is a block diagram illustrating a third exemplary embodiment in which an information classification system is configured by using the information classification device of this invention. The information classification device includes an information analysis device 100 and a data accumulation device 300.

Referring to FIG. 18, the information analysis device 100 includes at least a main memory 101, a CPU 102, a data storage device 103, a communication device 104, an input device 106, and an output device 107, and has functions similar to those of the information analysis device 20 of the second exemplary embodiment. The information analysis device 100 is connected to the data accumulation device (data accumulating means) 300 via a communication network 200. The data accumulation device 300 stores data obtained through the communication network 200, and accumulates data capable of containing individual information or product information as a target of information analysis, thereby realizing a function similar to that of the data storage unit 25 of FIG. 12.

FIG. 18 illustrates only one data accumulation device 300. However, the information analysis device 100 may be connected to two or more data accumulation devices 300. In other words, data may be dispersed to two or more data accumulation devices to be accumulated. Moreover, some or all of data which become targets of information analysis may be accumulated in the data storage device 103 of the information analysis device 100.

In addition, data that becomes a target of information analysis is not limited to a file created by a word processor or a text editor. The data may be any type of files capable of containing text data, for example, an execution program file.

The data accumulation device 300 may not be a device which always has to hold each data for a long time, for example, a device which functions as an E-mail transmission server. For example, when the data accumulation device 300 functions as a part of the E-mail transmission server, before transmission of E-mail data transmitted from one or more terminal devices (not shown) via the communication network 200 to the other terminal device or an E-mail reception server (not shown), whether information of a specific type is contained in the E-mail data may be checked by the information analysis device 100 of the third exemplary embodiment.

Next, components of the information analysis device 100 of the third exemplary embodiment will be described. The CPU 102 executes processing according to a program 105 stored in the main memory 101. The program 105 is an information analysis program for executing processing of the text data extraction unit 21, the keyword extraction unit 22, the table record estimation unit 23, the data classification unit 24, and the result display unit 26 illustrated in FIG. 12. Thus, an operation of each unit is realized by the CPU 102. The program 105 may be stored in a portable storage medium readable by the CPU 102.

The data storage device 103 stores at least the keyword dictionary 27 illustrated in FIG. 12, the correspondence information 501 of the classification rule storage unit 4a, and the division criterion. The data that becomes a target of information analysis may be stored. In this case, the CPU 102 refers to the data stored in the data storage device 103.

The communication device 104 is an interface between the CPU 102 and the communication network 200. The communication device 104 accesses the data accumulation device 300 via the communication network 200, whereby the CPU 102 refers to the data accumulated in the data accumulation device 300.

The input device 106 is an information input device such as a keyboard or a mouse, and instructs the CPU 102 to execute or stop processing, or display a processing result. The CPU 102 controls the output device 107 to display and output the processing result. When the information analysis device 100 includes a printer (not shown), the CPU 102 may output the processing result in a print sheet by the printer.

According to the third exemplary embodiment, the information analysis device 100 may be replaced with the table record estimation device 10 illustrated in FIGS. 1 and 2 to realize an information classification system.

Effects of Third Exemplary Embodiment

According to the third exemplary embodiment, the information analysis device 100 is connected to the data accumulation device 300 via the communication network 200, and hence the information analysis device 100 does not have to include any data accumulation device. Further, the information analysis device 100 can be connected to a plurality of data accumulation devices 300 via the communication network 200, and hence availability can be improved for disasters or damages. Moreover, whether predetermined information is contained in information transmitted or received via a network can be checked, for example, before E-mail data sent from the terminal device via the communication network 200 is transmitted to the other terminal device or the E-mail reception server, whether information of a specific type is contained in the E-mail data can be checked by the information analysis device 100.

As described above, according to this invention, even when there is no prior knowledge of a file format of data such as a document or identification patterns of records constituting table data, the individual records constituting the table data can be accurately estimated. For this reason, this invention can be applied to an in-organization information management system which clarifies a file containing a set of keywords indicating individual information or financial information and types or the number of pieces of the individual information or financial information from a great volume of files of various description formats accumulated in a web server, a file server or a terminal device in the organization, and useful for assisting information security inspection or information resource management. This invention can also be applied to a data retrieval system based on contents of data, which can accurately find an inventory-taking document containing facility information by detecting data containing many sets of keywords such as a product name, a date and time, a price, and a stock place.

Modes of the information classification device, the information classification method, and the information classification program of this invention will be described below.

The labeling unit of the information classification device of this invention replaces two or more adjacent character strings of the same type with one label.

The information classification device of this invention may further include a correspondence information storage unit for storing correspondence information defining correspondence between types of the extracted character strings and the labels to replace the character strings. In this case, the labeling unit replaces, based on the correspondence information, the extracted character string with the label for each type.

The label appearance pattern estimation unit of the information classification device of this invention sequentially estimates the appearance patterns while adding labels omitted between a present appearance pattern and a preceding or succeeding appearance pattern.

The character information extraction unit of the information classification device of this invention includes an extraction information storage unit for storing extraction information to extract the character strings from the character information of the data, and extracts the character strings from the character information of the data based on the extraction information.

The information classification device of this invention may further include a division criteria storage unit for storing a predetermined division criterion. In this case, the character information extraction unit divides a set of character strings extracted based on the extraction information into a plurality of partial character string sets based on the predetermined division criterion. The labeling unit replaces the character strings included in the partial character string sets with the label for each type. The label appearance pattern estimation unit receives, as an input, a label string obtained by the replacement of the partial character string set by the labeling unit to estimate label appearance pattern.

In the information classification device of this invention, the predetermined division criterion is set as whether a distance between adjacent character strings in the data is a prescribed value or more and, based on whether the division criterion is satisfied, the character strings may be included in different partial character string sets or the character strings may be included in the same partial character string set.

In the information classification device of this invention, the correspondence information may define, for each of the extracted character strings, correspondence regarding a broader class or a narrower class relative to the type of classified character string. In this case, the information classification device may further include a character information classification unit. The character information classification unit correlates, based on the correspondence information, each label represented by the estimated appearance pattern with an optional class of each of the character strings before the replacement, a broader class relative to the optional class, or a narrower class relative to the optional class, and selects suitable character information suited to a predetermined combination to classify the character strings extracted from the data.

The character information classification unit of the information classification device of this invention may collate, if there is any classification condition established by the character string of a single type, before processing of replacing the two or more adjacent character strings of the same type with one label by the labeling unit, the label string with the classification condition to execute classification based on the classification condition.

The character information extraction unit of the information classification device of this invention may include a keyword dictionary for storing keyword information defining keywords extracted as the character strings for the each type as the extraction information storage unit. In this case, the character information extraction unit may further include a data storage unit for storing data such as a document, a text data extraction unit for referring to the data stored in the data storage unit to extract text data from the data referred to, and a keyword extraction unit for extracting the keywords from the extracted text data based on the keyword information stored in the keyword dictionary to generate a keyword string as the character string.

The information classification device of this invention may further include a result output unit for outputting a result the classification.

In the labeling processing of the information classification method of this invention, character strings are converted into the series of label strings by replacing two or more adjacent character strings of the same type included in a set of the extracted character strings with one label.

The information classification method of this invention may further include correspondence information storage processing of storing correspondence information defining correspondence between types of extracted character strings and the labels to replace the character strings. In this case, in the labeling processing, based on the correspondence information, the extracted character string is replaced with the label for each type.

In the label appearance pattern estimation processing of the information classification method of this invention, the appearance patterns may be sequentially estimated while adding labels omitted between a present appearance pattern and a preceding or succeeding appearance pattern.

In the information classification method of this invention, the correspondence information may define, for each of the extracted character strings, correspondence regarding a broader class or a narrower class relative to the type of classified character strings. In this case, the information classification method may further include character information classification processing. The character information classification processing correlates each label represented by the estimated appearance pattern with an optional class of each of the character strings before the replacement, a broader class relative to the optional class, or a narrower class relative to the optional class, and selects suitable character information suited to a predetermined combination to classify the character strings extracted from the data.

In the character information classification processing of the information classification method of this invention may collate, if there is any classification condition established by the character string of a single type, before processing of replacing two or more adjacent character strings of the same type with one label in the labeling processing, the label string with the classification condition to execute classification based on the classification condition.

The information classification method of this invention may further include processing of outputting a result the classification.

The information classification program of this invention may control the computer to execute, in the labeling processing, processing of converting the character strings into the series of label strings by replacing two or more adjacent character strings of the same type included in a set of the extracted character strings with one label.

The information classification program of this invention may further control the computer to execute correspondence information storage processing of storing correspondence information defining correspondence between types of extracted character strings and the labels to replace the character strings. In this case, in the labeling processing, based on the correspondence information, the extracted character string is replaced with a label for each type.

The information classification program of this invention may execute, in the label appearance pattern estimation processing, sequential estimation of the appearance patterns while adding labels omitted between a present appearance pattern and a preceding or succeeding appearance pattern.

In the information classification program of this invention, the correspondence information may define, for each of the extracted character strings, correspondence regarding a broader class or a narrower class relative to the type of classified character strings. In this case, the information classification program may further control the computer to execute character information classification processing. The character information classification processing correlates each label represented by the estimated appearance pattern with an optional class of each character string before replacement, a broader class relative to the optional class, or a narrower class relative to the optional class, and selects suitable character information suited to a predetermined combination to classify the character strings extracted from the data.

The information classification program of this invention may collate, in the character information classification processing, if there is any classification condition established by the character string of a single type, before processing of replacing two or more adjacent character strings of the same type with one label in the labeling processing, the label string with the classification condition to execute classification based on the classification condition.

The information classification program of this invention may further control the computer to execute processing of outputting a result of the classification.

This invention has been described by way of exemplary embodiments and examples. However, this invention is not limited to the exemplary embodiments or the examples. Various changes and modifications can be made without departing from its technical ideas.

The invention claimed is:

1. An information classification device for analyzing a configuration of data containing character information, comprising:
   character information extracting means for extracting predetermined character strings from the character information of the data;
   labeling means for converting the extracted character strings into a series of label strings by replacing each of the extracted character strings with a label indicating a class of the character string; and
   label appearance pattern estimating means for estimating an appearance pattern that is defined as a set of different labels repeatedly appearing in the label strings obtained by the labeling means,
   wherein the labeling means converts the extracted character strings into the series of label strings by converting the extracted character strings into initial label strings, identifying, in the initial label strings, any series of the same label appearing at least twice in a row, and replacing any of the series of the same label with a single label, such that in resultant series of label strings, two or more of the same labels do not appear adjacently;
   and further comprising: correspondence information storing means for storing correspondence information defining correspondence between classes of the extracted character strings and the labels to replace the character strings,
   wherein the labeling means replaces, based on the correspondence information, the extracted character string with the label for each class, and
   wherein:
      the correspondence information defines, for each of the extracted character strings, correspondence regarding a broader class or a narrower class relative to the class of classified character string; and
      the information classification device further comprises character information classifying means, the character information classifying means correlating, based on the correspondence information, each label represented by the estimated appearance pattern with an optional class of each of the character strings before the replacement, a broader class relative to the optional class, or a narrower class relative to the optional class, and selecting suitable character information suited to a predetermined combination to classify the character strings extracted from the data.

2. An information classification device according to claim 1, wherein:
   the character information extracting means extracts, for each class of the character strings, the predetermined character strings from the data containing the character strings with an appearance order having been defined.

3. An information classification device according to claim 1, wherein the label appearance pattern estimating means sequentially estimates the appearance pattern while adding labels omitted between a present appearance pattern and a preceding or succeeding appearance pattern.

4. An information classification device according to claim 1, wherein the character information extracting means comprises extraction information storing means for storing extraction information to extract the character strings from the character information of the data, and extracts the character strings from the character information of the data based on the extraction information.

5. An information classification device according to claim 4, further comprising division criteria storing means for storing a predetermined division criterion, wherein:
   the character information extracting means divides a set of the character strings extracted based on the extraction information into a plurality of partial character string sets based on the predetermined division criterion;
   the labeling means replaces the character strings included in the partial character string sets with the label for each class; and
   the label appearance pattern estimating means receives, as an input, a label string obtained by the replacement of the partial character string set by the labeling means to estimate a label appearance pattern.

6. An information classification device according to claim 5, wherein:
   the predetermined division criterion is set as whether a distance between adjacent character strings in the data is a prescribed value or more; and
   based on whether the division criterion is satisfied, the character strings are included in different partial character string sets or the character strings are included in the same partial character string set.

7. An information classification device according to claim 1, wherein the character information classifying means collates, if there is any classification condition established by the character string of the same class, before processing of replacing two or more adjacent character strings of the same class with one label by the labeling means, the label string with the classification condition to execute classification based on the classification condition.

8. An information classification device according to claim 4, wherein:
   the character information extracting means further comprises a keyword dictionary for storing keyword information defining keywords extracted as the character strings for the each class as the extraction information storing means; and
   the character information extracting means further comprises:
      data storing means for storing data such as a document;
      text data extracting means for referring to the data stored in the data storing means to extract text data from the data referred to; and
      keyword extracting means for extracting the keywords from the extracted text data based on the keyword information stored in the keyword dictionary to generate a keyword string as the character string.

9. An information classification device according to claim 1, further comprising result outputting means for outputting a result of the classification.

10. An information classification system, comprising:
   the information classification device according to claim 1; and
   at least one data accumulating means connected to the information classification device via a communication network to store data obtained through the communication network,
   wherein the character information extracting means of the information classification device extracts the predetermined character strings from the character information of the data stored in the data accumulating means.

11. An information classification method for analyzing a configuration of data containing character information, comprising:
- character information extraction processing of extracting predetermined character strings from the character information of the data;
- labeling processing of converting the extracted character strings into a series of label strings by replacing each of the extracted character strings with a label indicating a class of the character string; and
- label appearance pattern estimation processing of estimating an appearance pattern that is defined as a set of different labels repeatedly appearing in the label strings,
- wherein, in the labeling processing, the extracted character strings are converted into the series of label strings by converting the extracted character strings into initial label strings, identifying, in the initial label strings, any series of the same label appearing at least twice in a row, and replacing any of the series of the same label with a single label, such that in resultant series of label strings, two or more of the same labels do not appear adjacently;
- the information classification method further comprising correspondence information storage processing of storing correspondence information defining correspondence between classes of extracted character strings and the labels to replace the character strings,
- wherein, in the labeling processing, based on the correspondence information, the extracted character string is replaced with the label for each class, and wherein:
- the correspondence information defines, for each of the extracted character strings, correspondence regarding a broader class or a narrower class relative to the class of classified character strings,
- the information classification method further comprises character information classification processing,
- wherein, in the character information classification processing, each label represented by the estimated appearance pattern is correlated with an optional class of each of the character strings before the replacement, a broader class relative to the optional class, or a narrower class relative to the optional class, and suitable character information suited to a predetermined combination is selected to classify the character strings extracted from the data.

12. An information classification method according to claim 11, wherein, in the label appearance pattern estimation processing, the appearance patterns are sequentially estimated while adding labels omitted between a present appearance pattern and a preceding or succeeding appearance pattern.

13. An information classification method according to claim 11, wherein, in the character information classification processing, if there is any classification condition established by the character string of the same class, before processing of replacing two or more adjacent character strings of the same class with one label in the labeling processing, the label string is collated with the classification condition to execute classification based on the classification condition.

14. An information classification method according to claim 11, further comprising processing of outputting a result of the classification.

15. A non-transitory computer-readable medium having an information classification program recorded thereon for causing a computer to execute analysis of a configuration of data containing character information, and to execute:
- character information extraction processing of extracting predetermined character strings from the character information of the data;
- labeling processing of converting the extracted character strings into a series of label strings by replacing each of the extracted character strings with a label indicating a class of the character string; and
- label appearance pattern estimation processing of estimating an appearance pattern that is defined as a set of different labels repeatedly appearing in the label strings,
- wherein, in the labeling processing, processing of converting the extracted character strings into the series of label strings by converting the extracted character strings into initial label strings, identifying, in the initial label strings, any series of the same label appearing at least twice in a row, and replacing any of the series of the same label with a single label, such that in resultant series of label strings, two or more of the same labels do not appear adjacently,
- the program further causing the computer to execute correspondence information storage processing of storing correspondence information defining correspondence between classes of extracted character strings and the labels to replace the character strings,
- wherein, in the labeling processing, based on the correspondence information, processing of replacing the extracted character string with a label for each class is executed, and wherein:
- the correspondence information defines, for each of the extracted character strings, correspondence regarding a broader class or a narrower class relative to the class of classified character strings;
- the information classification program further causes the computer to execute character information classification processing; and
- in the character information classification processing, processing of correlating each label represented by the estimated appearance pattern with an optional class of each character string before replacement, a broader class relative to the optional class, or a narrower class relative to the optional class, and selecting suitable character information suited to a predetermined combination to classify the character strings extracted from the data is executed.

16. The non-transitory computer-readable medium having the information classification program according to claim 15, wherein, in the label appearance pattern estimation processing, sequential estimation of the appearance patterns is executed while adding labels omitted between a present appearance pattern and a preceding or succeeding appearance pattern.

17. The non-transitory computer-readable medium having the information classification program according to claim 15, wherein, in the character information classification processing, if there is any classification condition established by the character string of the same class, before processing of replacing two or more adjacent character strings of the same class with one label in the labeling processing, the label string is collated with the classification condition to execute classification based on the classification condition.

18. The non-transitory computer-readable medium having the information classification program according to claim 15, further causing the computer to execute processing of outputting a result of the classification.

* * * * *

UNITED STATES PATENT AND TRADEMARK OFFICE
CERTIFICATE OF CORRECTION

PATENT NO. : 9,025,890 B2
APPLICATION NO. : 12/302483
DATED : May 5, 2015
INVENTOR(S) : Itaru Hosomi Page 1 of 1

It is certified that error appears in the above-identified patent and that said Letters Patent is hereby corrected as shown below:

In The Specification
Column 8, Line 55: delete "{AABBCABBBDCMD}" and insert -- {AABBCABBBDCAAD} --

Signed and Sealed this
Seventeenth Day of November, 2015

Michelle K. Lee
*Director of the United States Patent and Trademark Office*